(12) United States Patent
Mukojima

(10) Patent No.: US 11,009,696 B2
(45) Date of Patent: May 18, 2021

(54) VEHICLE LAMP

(71) Applicant: Koito Manufacturing Co., Ltd., Tokyo (JP)

(72) Inventor: Kenta Mukojima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 59 days.

(21) Appl. No.: 16/434,529

(22) Filed: Jun. 7, 2019

(65) Prior Publication Data

US 2019/0384054 A1 Dec. 19, 2019

(30) Foreign Application Priority Data

Jun. 13, 2018 (JP) .............................. JP2018-112379

(51) Int. Cl.
| | |
|---|---|
| *G02B 26/08* | (2006.01) |
| *G02B 26/10* | (2006.01) |
| *B60Q 1/00* | (2006.01) |
| *F21S 41/13* | (2018.01) |
| *F21S 41/663* | (2018.01) |
| *F21S 41/675* | (2018.01) |
| *H04B 10/116* | (2013.01) |
| *F21S 41/147* | (2018.01) |

(52) U.S. Cl.
CPC ......... *G02B 26/105* (2013.01); *B60Q 1/0023* (2013.01); *F21S 41/13* (2018.01); *F21S 41/147* (2018.01); *F21S 41/663* (2018.01); *F21S 41/675* (2018.01); *H04B 10/116* (2013.01); *B60Q 2300/00* (2013.01)

(58) Field of Classification Search
CPC ............. G02B 26/105; B60Q 1/0023; B60Q 2300/00; B60Q 2300/41; B60Q 2300/42; B60Q 1/085; B60Q 1/0041; H04B 10/116; F21S 41/141; F21S 41/67; F21S 41/13; F21S 41/663; F21S 41/675; F21S 41/147; F21S 41/321; F21S 41/336; F21S 41/18; F21S 41/285; F21S 41/148; F21S 41/151; F21S 41/39; F21S 41/255; F21S 45/47; F21V 23/0442; F21W 2102/135; F21W 2107/10; F21W 2102/145; F21Y 2115/10
USPC ...................................................... 359/224.1
See application file for complete search history.

(56) References Cited

U.S. PATENT DOCUMENTS

| | | | |
|---|---|---|---|
| 2009/0015388 A1* | 1/2009 | Yagi .................. | B60Q 1/24 340/435 |
| 2015/0137680 A1* | 5/2015 | Komatsu ............ | F21S 41/16 315/82 |

FOREIGN PATENT DOCUMENTS

| | | |
|---|---|---|
| JP | 2009-018726 A | 1/2009 |
| JP | 2012-224317 A | 11/2012 |

OTHER PUBLICATIONS

An Office Action dated Jun. 17, 2020, issued from the Korean Intellectual Property Office (KIPO) of Korean Patent Application No. 10-2019-0069223 and an English translation thereof (8 pages).

* cited by examiner

*Primary Examiner* — Euncha P Cherry

(74) *Attorney, Agent, or Firm* — Abelman, Frayne & Schwab

(57) ABSTRACT

A vehicle lamp includes: a light source; and a scanner configured to scan light emitted from the light source, and configured to irradiate the scanned light toward outside a vehicle. The light source includes a plurality of visible light sources configured to emit visible light, and at least one infrared light source configured to emit infrared light, and the infrared light source is arranged between the visible light sources.

18 Claims, 8 Drawing Sheets

VEHICLE LAMP

CROSS-REFERENCE TO RELATED APPLICATIONS

This application is based on and claims priority from Japanese Patent Application No. 2018-112379, filed on Jun. 13, 2018, with the Japan Patent Office, the disclosure of which is incorporated herein in its entirety by reference.

TECHNICAL FIELD

The present disclosure relates to a vehicle lamp including a visible light source that emits visible light for illumination, and an infrared light source that emits infrared light for detecting an object such as other vehicles.

BACKGROUND

In an effort to enhance the safe driving of a vehicle such as an automobile, for example, a vehicle lamp has been proposed which illuminates the front area of the automobile with visible light, irradiates infrared light toward the front area, and detects an object based on the infrared light reflected by the object. Further, in order to enhance the visibility of the driving area of the vehicle or the peripheral area thereof, a technique of scanning with visible light to illuminate the front area has also been proposed.

Japanese Patent Laid-Open Publication No. 2009-018726 proposes a technique in which a visible light source together with a light emitter and light receiver of an infrared sensor are arranged in a lamp housing, and visible light emitted from the visible light source and infrared light emitted from the light emitter (infrared light source) are scanned by a scanning mirror to irradiate the front area of a vehicle. According to the technique, an object (obstacle) present in the front area may be detected using infrared light and visible light may be irradiated to the detected object so that an occupant may visually recognize the object.

SUMMARY

In the technique disclosed in Japanese Patent Laid-Open Publication No. 2009-018726, light flux (light beam) emitted from the visible light source and the infrared light source is irradiated while being scanned by single scanning mirror, and the irradiation areas of visible light and infrared light are substantially the same. Therefore, when the irradiation area of visible light is extended to the outside of the driving area of a vehicle, the irradiation area of infrared light is also extended accordingly, so that an object that is not involved in driving may be detected. In contrast, when the irradiation area of infrared light is limited to the driving area of the vehicle, the irradiation area of visible light becomes narrow, so that an occupant may not visually recognize the peripheral area of the driving area.

In order to solve the problems above, it is conceivable to scan visible light and infrared light with separate scanning units that are independent from each other, which has been proposed in Japanese Patent Laid-Open Publication No. 2009-018726. However, it requires at least two scanning units, so that the number of components that constitute the lamp increases, the lamp structure becomes complex and large, and the cost is increased.

The present disclosure is to provide a vehicle lamp capable of irradiating visible light and infrared light to different predetermined areas respectively, while avoiding complication of the lamp structure.

The present disclosure relates to a vehicle lamp including: a light source; and a scanner configured to scan light emitted from the light source, and irradiate the scanned light toward outside a vehicle. The light source includes a plurality of visible light sources configured to emit visible light, and at least one infrared light source configured to emit infrared light. The infrared light source is arranged between the visible light sources. In this case, for example, the visible light source and the infrared light source are arranged in parallel in a scanning direction of the scanner.

In the present disclosure, light sources disposed at both ends of the plurality of light sources that are arranged are constituted by visible light sources. Further, in the plurality of visible light sources that are arranged, respective irradiation areas of adjacent visible light sources are continuous in the scanning direction, and in the plurality of infrared light sources that are arranged, respective irradiation areas of adjacent infrared light sources are continuous in the scanning direction. An area obtained by combining the irradiation areas of the plurality of visible light sources is further expanded into both sides of the scanning direction than an area obtained by combining the irradiation areas of the plurality of infrared light sources.

According to the present disclosure, it is possible to provide a vehicle lamp capable of sharing a scanner that scans visible light and infrared light, and also capable of irradiating each of visible light and infrared light to different predetermined areas, and thus, simplification of the lamp structure and cost reduction are realized.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
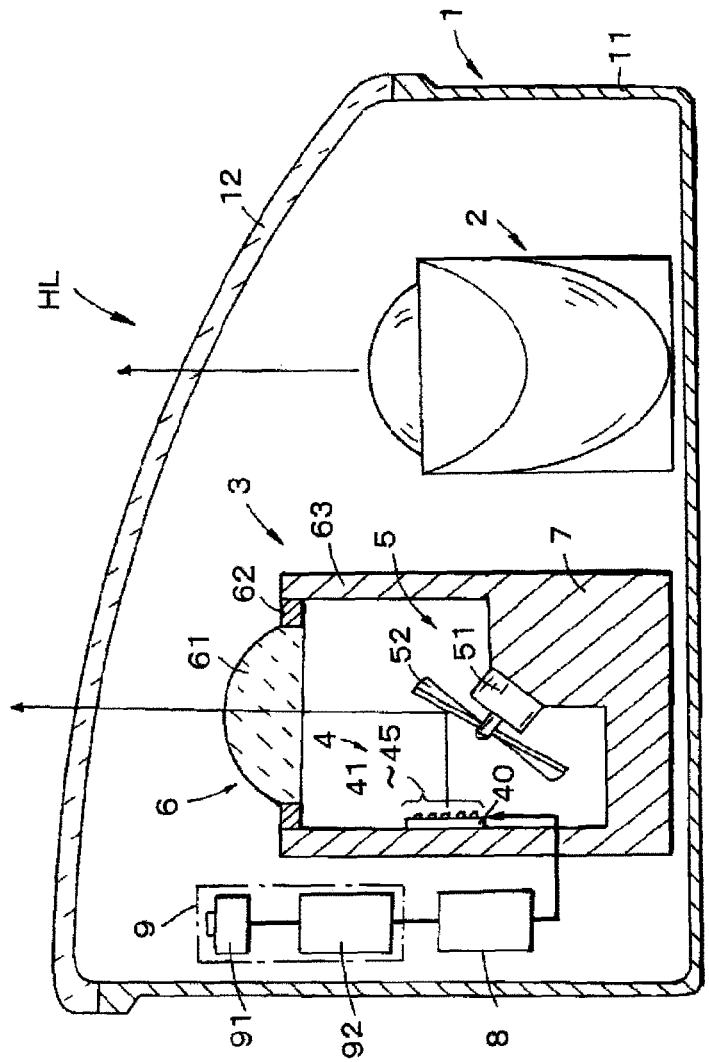
FIG. 1 is a schematic horizontal cross-sectional view of a head lamp of a vehicle to which the present disclosure is applied.

Next, an embodiment of the present disclosure will be described with reference to the drawings. FIG. 1 is a schematic horizontal cross-sectional view of a head lamp HL of a vehicle to which the present disclosure is applied. The head lamp HL includes a lamp housing 1 constituted by a lamp body 11 and a translucent front cover 12, and is constituted by a low-beam lamp unit 2 and a high-beam lamp unit 3 internally provided in the lamp housing 1.

The low-beam lamp unit 2 is constituted by a reflector type lamp unit or a projector type lamp unit which has been proposed in the related art, but here, constituted by a projector type lamp unit. When the low-beam lamp unit 2 is turned ON, as illustrated in FIG. 2, the low-beam lamp unit 2 has a cut off line COL that extends substantially along a horizontal line H in the front area of the vehicle, and is configured to perform illumination with a low-beam light distribution pattern PL that illuminates an area lower than the cut off line COL. The cut off line COL has different heights at the right side (opposite lane side) and at the left side (own lane side) of a vertical line V.

Here, the high-beam lamp unit 3 is configured as a lamp unit for adaptive driving beam (ADB) light distribution control. The structure of the high-beam lamp unit 3 will be described later, but as illustrated the light distribution characteristic view of FIG. 2B, the structure of the high-beam lamp unit 3 is constituted by a plurality of irradiation areas P1 to P6 aligned in the horizontal direction, and when it is turned ON as a high-beam lamp, illumination is performed as a high-beam light distribution pattern PH synthesized such that all the irradiation areas P1 to P6 are continuous in the horizontal direction. This high-beam light distribution pattern PH illuminates an upper area of the low-beam light distribution pattern PL including the cut off line COL.

Further, although the details will be described later, when the high-beam lamp unit 3 is under an ADB control, one of the irradiation areas P1 to P6 is selectively turned ON or OFF (including light attenuation). As a result, an area in which other vehicles such as an oncoming vehicle or a preceding vehicle are present becomes a non-irradiated area to avoid glare to the other vehicles, and at the same time, the ADB light distribution control that enhances the visibility of the front area of the vehicle is implemented by illuminating the area above the cut off line for the other areas.

The present disclosure is applied to the high-beam lamp unit 3, and as illustrated in FIG. 1, this high-beam lamp unit 3 includes a light source 4, a scanner 5, and a projector 6, and is configured to control the lighting by a lighting controller 8.

The light source 4 is mounted on a part of a heat sink 7 internally supported by the lamp housing 1. The heat sink 7 includes a plurality of heat radiation fins (not illustrated), and is configured to radiate heat generated when the light source 4 emits light from the heat sink 7 to the outside.

Figure 3A:
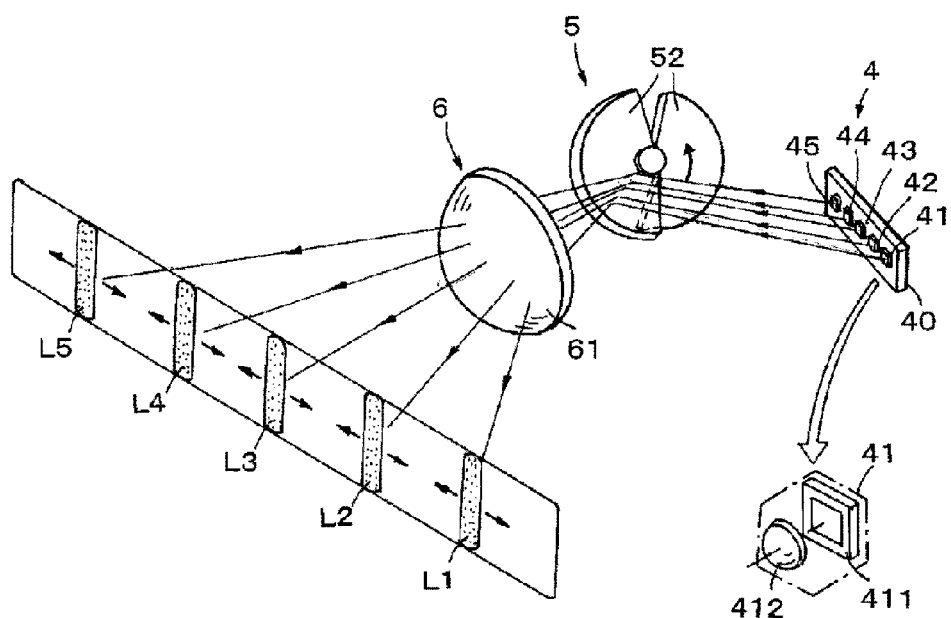
FIG. 3A is a schematic perspective view of a lamp unit according to the present disclosure and FIG. 3B is a front view of a light source according to the present disclosure.
Figure 3B:
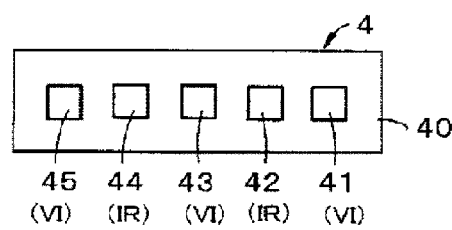

FIG. 3A is a schematic perspective view illustrating a schematic configuration of the high-beam lamp unit 3, and the light source 4 includes a circuit board 40 supported by the heat sink 7, and as illustrated in FIG. 3B, five light sources are mounted on the circuit board 40. Each of the light sources is constituted by a light emitting element, and here, LEDs (light emitting diode) 41 to 45 are mounted in a state of being arranged horizontally in a line.

The five LEDs 41 to 45 are constituted by three visible (VI) LEDs 41, 43, and 45, and two infrared (IR) LEDs 42 and 44. The visible LEDs 41, 43, and 45 emit white light when they emit light, and the infrared LEDs 42 and 44 emit infrared light when they emit light. Then, these visible LEDs 41, 43, and 45 and infrared LEDs 42 and 44 are arranged alternately, and the visible LEDs 41, 43, and 45 are arranged at the center and both ends, so that the infrared LEDs 42 and 44 are arranged on both sides which sandwich the visible LED 43 at the center therebetween.

In each of the LEDs 41 to 45, as illustrated representative of one LED 41 in a part of FIG. 3A, an LED chip 411 that emits light when power is supplied and a condensing lens 412 that is arranged to face an light emitting surface of the LED chip 411 are integrated, and the light emitted from the LED chip 411 is emitted toward the scanner 5 as light flux (light beam) having a required diameter dimension by the condensing lens 412. Each of the LEDs may use a discrete LED. Further, the light emitting element may be an LD (laser diode).

The scanner 5 is arranged in a position facing the light source 4 in the horizontal direction, and is configured as a rotating reflector including a motor 51 supported by the heat sink 7 and a rotating blade 52 rotationally driven by the motor 51. The rotating blade 52 is constituted by a plurality of (in this case, two) semicircular light reflective blades having a surface serving as a light reflective surface, and the rotating blades 52 are attached side by side in a circumferential direction with respect to a rotation axis of the motor 51.

Further, the two rotating blades 52 are point symmetrical with respect to the rotation center of the motor 51, and are formed as twisting surfaces in which an inclination angle in the radial direction of the light reflective surface, that is, an inclination angle in the horizontal direction with respect to the emission direction of the light that is emitted from the light source 4 is changed continuously along the circumferential direction. Further, the light reflective surface of each of the rotating blades 52 is directed at an angle based on 45 degrees with respect to the light source 4 in the horizontal direction. As a result, the rotating blades 52 reflect the light emitted from the light source 4 to be bent substantially at a right angle to the horizontal direction. When the motor 51 is driven, the rotating blades 52 are rotationally driven, and in accordance with the rotation, the light path is scanned in the horizontal direction and projected toward the projector 6.

The projector 6 includes a projecting lens 61 having required optical characteristics, and the projecting lens 61 is supported by the heat sink 7 by a lens holder 62 and a stem 63 that is constituted as a part of the heat sink 7. The projecting lens 61 projects the light reflected from the scanner 5 toward the front area of the vehicle. However, here, the light fluxes L1 to L5 of the five LEDs 41 to 45 are refracted to be expanded respectively in the up and down direction, that is, in the vertical direction, and are shaped into elongated light fluxes in the vertical direction. Therefore, the five light fluxes L1 to L5 elongated in the vertical direction are scanned by the scanner 5 in the horizontal direction, respectively.

Further, the head lamp HL includes an object detecting device 9 in this embodiment. The object detecting device 9 includes an imaging element 91 having a light receiving sensitivity to infrared light and an image analysis unit 92. The imaging element 91 images an object that is illuminated by infrared light in the front area of the vehicle, in particular, by the infrared light irradiated toward the front area from the infrared LEDs 42 and 44. Further, the image analysis unit 92 performs a required image analysis based on an imaging signal obtained by imaging with the imaging element 91, and detects an object present in the front area, that is, a preceding vehicle or an oncoming vehicle, and outputs a detection signal. Here, the imaging element 91 may be constituted by a line sensor that receives infrared light reflected by an object.

The lighting controller 8 is connected to the object detecting device 9 and the light source 4, and when the detection signal for the detected object is input to the object detecting device 9, the lighting controller 8 controls the lighting of each of the LEDs 41 to 45 of the light source 4 based on the detection signal. Positional information of the detected object, that is, information on which direction of the front area of the own vehicle the preceding vehicle or the oncoming vehicle is present is contained in the detection signal. Further, the control of the lighting of each of the LEDs 41 to 45 controls light emission and light extinction of the LEDs, but may include a function of controlling the luminous intensity of the light emission when light is emitted. The lighting controller 8 may include a function of controlling a light source (not illustrated) of the low-beam lamp unit 2, and the lighting controller 8 is configured as such in this embodiment.

Figure 2A:
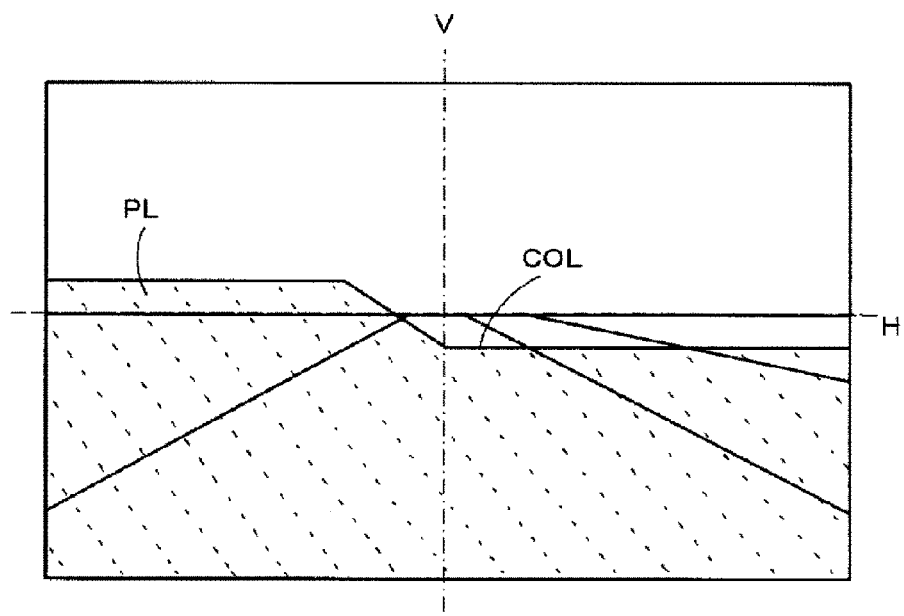
FIGS. 2A and 2B are light distribution characteristic views of low-beam light distribution and high-beam light distribution.

In the head lamp HL having the above configuration, when an occupant (driver) operates a lighting switch (not illustrated) to "low-beam," the low-beam lamp unit 2 is turned ON by the control of the lighting controller 8 that receives the operation above. At this time, as also illustrated in FIG. 2A, illumination with the low-beam light distribution pattern PL is performed that illuminates a driving area A1 in the front area of the vehicle, and the area below the cut off line COL substantially along the horizontal line H including a peripheral area A2 of the driving area A1, like a left-upward broken-lined area of the front area in FIG. 4.

Further, when the occupant operates the lighting switch to "high-beam," the lighting controller 8 controls the high-beam lamp unit 3 to the lighting state, in addition to the lighting of the low-beam lamp unit 2. In this control, only the visible LEDs 41, 43, and 45 of the light source 4 are emitting light, and at the same time, the scanner 5, that is, the rotating reflector is driven, so that the rotating blades 52 are rotationally driven in one direction. As a result, white light fluxes emitted from the three visible LEDs 41, 43, and 45 are projected on the rotating blades 52, reflected by the rotating blades 52 rotationally driven, and irradiated to the front area of the vehicle by the projecting lens 61.

Figure 2B:
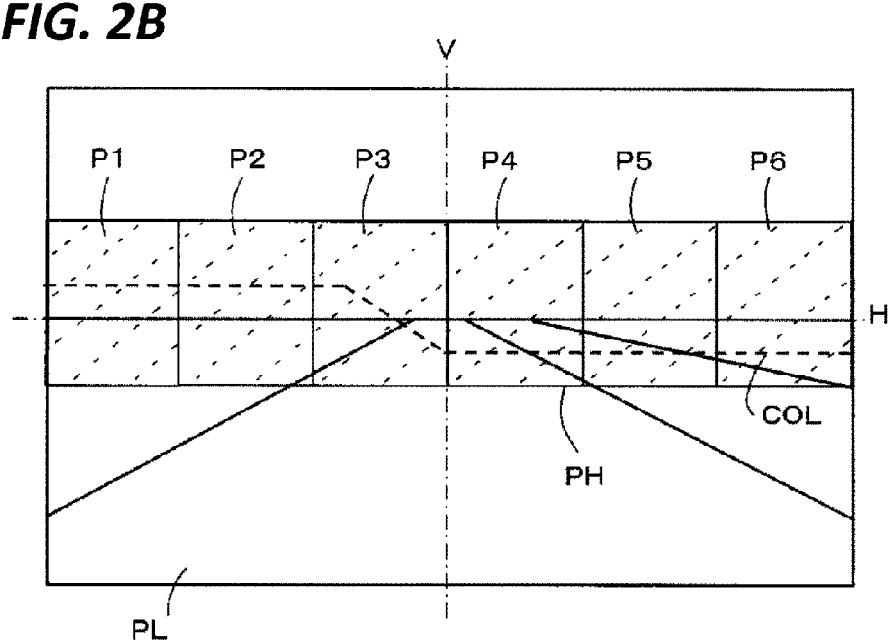
Figure 5:
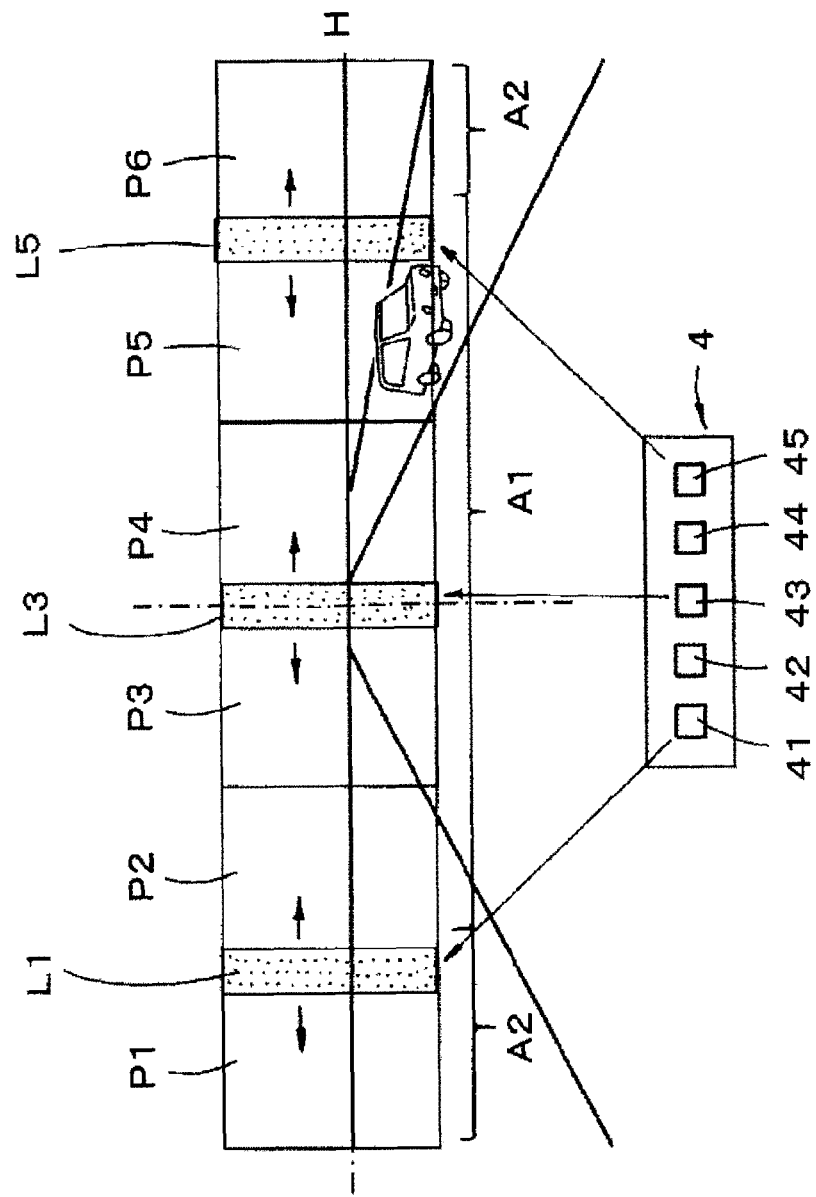
FIG. 5 is a view for explaining an irradiation area by scanning of visible light.

At this time, as illustrated in FIG. 5, the light fluxes L1, L3, and L5 emitted from the three visible LEDs 41, 43, and 45 are irradiated to the front area while being scanned over the required area in the horizontal direction by the rotation of the rotating blades 52. As a result, as also illustrated in FIG. 2B, the light fluxes L1, L3, and L5 of the visible LEDs 41, 43, and 45 become irradiation areas where the irradiation areas P1 and P2, P3 and P4, and P5 and P6 respectively adjacent in the horizontal direction are continuous in the horizontal direction, respectively.

Figure 4:
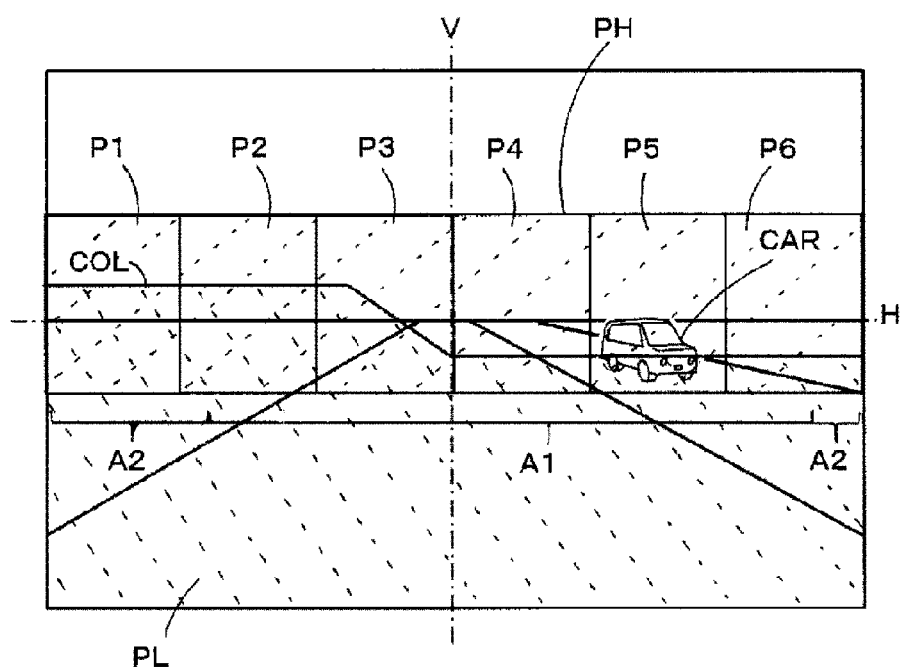
FIG. 4 is a view for explaining a light distribution pattern on the front area of the vehicle.

By synthesizing the irradiation areas P1 to P6 of these three visible LEDs 41, 43, and 45, the right-upward broken-lined high-beam light distribution pattern PH is obtained that illuminates the area above the low-beam light distribution pattern PL illustrated in FIG. 4, that is, the area above the cut off line COL. Therefore, the low-beam light distribution pattern PL and the high-beam light distribution pattern PH are synthesized and the illumination on the front area is performed. The irradiation area with the "high-beam" is a wide area including the driving area A1 of the vehicle and the peripheral area A2 thereof.

Meanwhile, when the occupant operates the lighting switch to "ADB control," the lighting controller 8 controls the low-beam lamp unit 2 to the turned ON state, and the light source 4 of the high-beam lamp unit 3 to emit light of the infrared LEDs 42 and 44. At the same time, since the scanner 5 is driven and the rotating blades 52 are rotationally driven, light fluxes L2 and L4 of the infrared light emitted from the two infrared LEDs 42 and 44 are irradiated to the front area of the vehicle while being scanned in horizontal direction.

Figure 6:
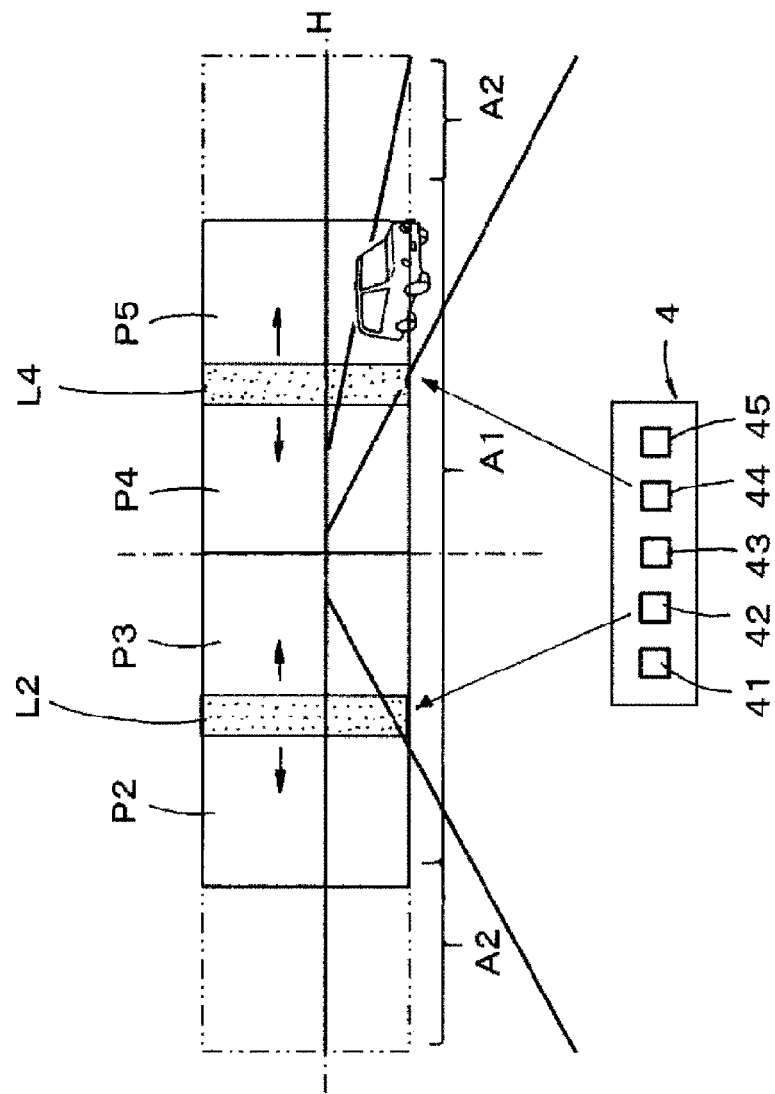
FIG. 6 is a view for explaining an irradiation area by scanning of infrared light.

The light fluxes L2 and L4 emitted from each of the infrared LEDs 42 and 44 are irradiated to the front area while being scanned over the required range in the horizontal direction, respectively. Therefore, as illustrated in FIG. 6, the light fluxes L2 and L4 of each of the infrared LEDs 42 and 44 are irradiated in a state where the irradiation areas P2 and P3, and P4 and P5 respectively adjacent in the horizontal direction are continuous in the horizontal direction. Since the two infrared LEDs 42 and 44 are arranged on the center side in the horizontal direction of the three visible LEDs 41, 43, and 45, the irradiation areas P2 to P5 of the infrared light is narrower than the irradiation areas P1 to P6 of the visible light, and irradiated substantially to the driving area A1 of the vehicle.

Figure 7:
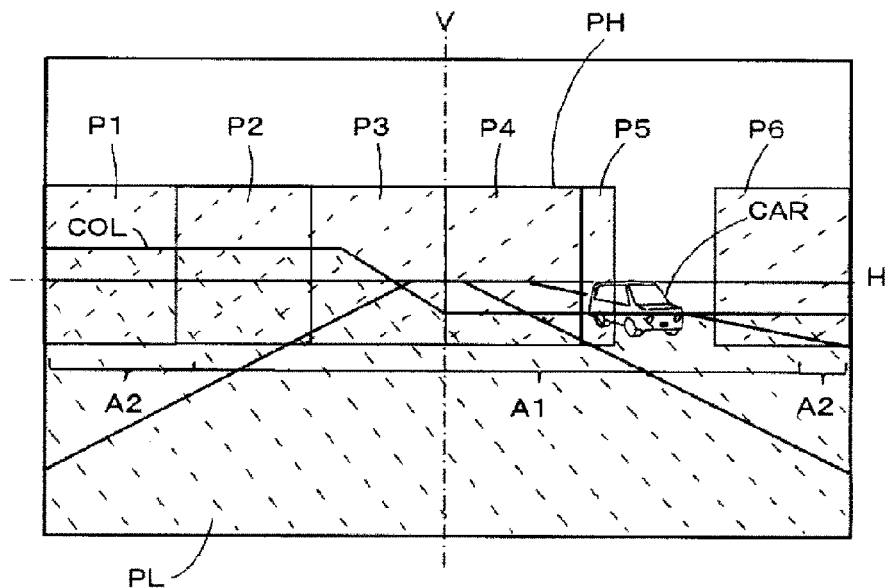
FIG. 7 is a view for explaining an ADB light distribution control.

Therefore, as illustrated in FIG. 7, when an object, here, an oncoming vehicle CAR is present in the driving area A1 to which infrared light is irradiated, the irradiated infrared light is reflected by the oncoming vehicle CAR, and the reflected light is imaged by the imaging element 91 of the object detecting device 9. Then, when the oncoming vehicle CAR is detected by the image analysis unit 92 based on the image that is imaged, the detection signal is output to the lighting controller 8. The lighting controller 8 receives the detection signal and controls the lighting of the visible LEDs 41, 43, and 45 of the light source 4, and controls such that the light flux of the visible LED is not irradiated to the area where the oncoming vehicle CAR is present.

Here, when the visible LEDs 41, 43, and 45 are emitting light chronologically continuously, the light flux from the visible LEDs 41, 43, and 45 is repeatedly scanned in the horizontal direction in accordance with the rotation of the rotating blades 52. However, the scanning is fast, the area scanned in the horizontal direction is the irradiation area when viewed by human's eyes. It is possible to change light intensity distribution in the horizontal direction to be scanned by timing controlling the light emission light intensity (including extinction at zero light intensity) of the visible LEDs 41, 43, and 45 synchronously with this scanning Therefore, it is possible to illuminate only the desired area and to decrease the light intensity of other areas or turn OFF for each of the irradiation areas P1 to P6.

In the example of FIG. 7, the light fluxes L1 and L3 of the visible light emitted from the visible LEDs 41 and 43 are scanned by the rotating blades 52 and irradiated to the irradiation areas P1 and P2, and P3 and P4, but with respect to the visible LED 45, the light emission thereof is stopped and turned OFF at the timing when the visible light is scanned to the irradiation area P5 where the oncoming vehicle CAR is present. Therefore, the irradiation is performed on the irradiation area P6, but the irradiation is not performed on a part of the irradiation area P5, that is, an area where the oncoming vehicle CAR is present.

As a result, when the ADB control is performed, in the irradiation areas P1 to P6 obtained by synthesizing the three visible LEDs 41, 43, and 45, visible light is not irradiated to a part of the area of the irradiation area P5 where the oncoming vehicle CAR is present, and visible light is irradiated to the other irradiation areas P1 to P4, and P6, so that a wide area including the driving area A1 and the peripheral area A2 thereof is illuminated, and then the ADB light distribution control in which the visibility of the front area of the vehicle is enhanced is implemented.

As described above, with the light source 4 configured by combining the visible LEDs 41, 43, and 45 and the infrared LEDs 42 and 44, both of visible light and infrared light may be scanned by a single scanner 5. Therefore, it is possible to suppress the increase in the number of components that constitute the scanner and the number of components that constitute the lamp. Thus, the lamp structure may be simplified and miniaturized, and the cost may be reduced.

Meanwhile, since the infrared LEDs 42 and 44 are arranged on the center side in the horizontal direction of the three visible LEDs 41, 43, and 45, the area obtained by synthesizing the irradiation areas P2 to P4 when turned ON becomes an area that is narrower in the left-right area than the area obtained by synthesizing the irradiation areas P1 to P6 of the visible LEDs. Therefore, by limitedly irradiating infrared light to the driving area A1 of the vehicle, it is possible to detect an object such as an oncoming vehicle or a preceding vehicle present in the driving area A1. That is, since unnecessary object present in the peripheral area A2 that is not directly involved to the driving of the vehicle is not detected, it is possible to prevent the useless influence on the ADB control due to detection of the unnecessary object.

In the embodiment, as a configuration of the light source, three visible LEDs and two infrared LEDs are arranged in a single row in the horizontal direction, but the number of each LED is not limited thereto, and the number of each LED may be set to an appropriate number. That is, a plurality of visible LEDs may be provided, and the number of infrared LEDs may be one or more, which is smaller than the number of the visible LEDs.

Figure 8A:
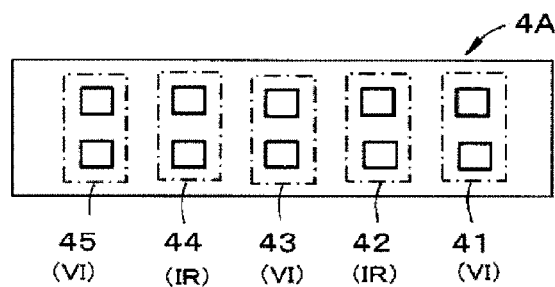
FIGS. 8A and 8B are schematic front views of modifications of a light source.

Further, each LED may be arranged in a plurality of units in the vertical direction. For example, in a light source in FIG. 8A, five rows of visible LEDs 41, 43, and 45 and infrared LEDs 42 and 44 in the horizontal direction are arranged in two sets in vertical direction, respectively. Even in this case, the visible LEDs 41, 43, and 45 and the infrared LEDs 42 and 44 are arranged alternately, and the visible LEDs 41 and 45 are arranged at both ends. By arranging the plurality of LEDs in the vertical direction in this manner, it is possible to expand the irradiation area (irradiation height range) of projected light flux in the vertical direction. Therefore, the design and the manufacture of the projecting lens 61 of the projector 6 become easier.

Figure 8B:
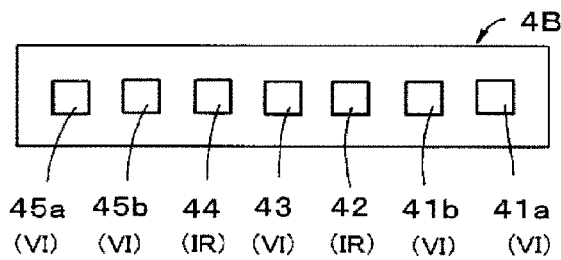

Further, visible LEDs and infrared LEDs may not necessarily be arranged alternately, that is, one by one. That is, when an arrangement is used in which an area illuminated by visible LEDs is an irradiation area that is continuous in the horizontal direction, and an area irradiated by infrared LEDs is also an irradiation area that is continuous in the horizontal direction, while the area irradiated by the infrared LEDs is an area narrower at both sides in the horizontal direction than the area illuminated by the visible LEDs, a configuration in which a plurality of components are arranged alternately, or a configuration in which an irregular number of components are arranged may be used. For example, seven LEDs are arranged in FIG. 8B, two visible LEDs 41a and 41b, and 45a and 45b are adjacently arranged at both ends, respectively. As a result, it is possible to illuminate a wider range of the peripheral area A2.

A plurality of visible light sources and infrared light sources that constitute the light source of the present disclosure are not limited to the LEDs in the embodiment, and may be semiconductor light emitting elements such as LDs or organic LEDs, or light sources such as light bulbs or discharge bulbs.

Figure 9:
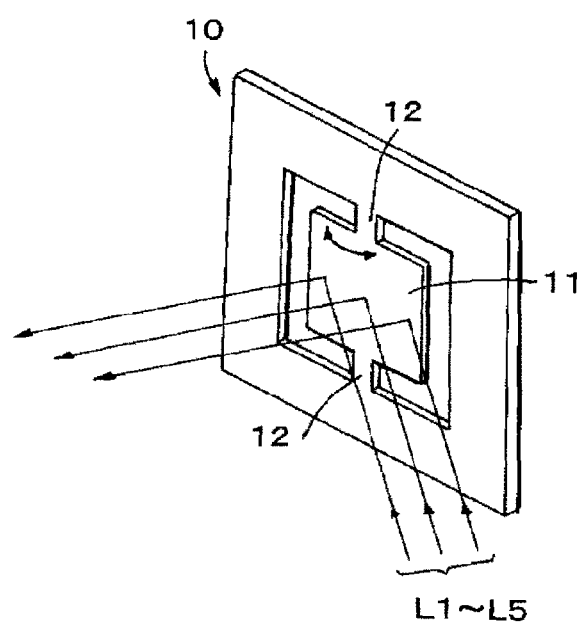
FIG. 9 is a schematic perspective view of a modification of a scanner.

The scanner according to the present disclosure is not limited to the rotating reflector structure disclosed in the embodiment. For example, although adopted also in Japanese Patent Laid-Open Publication No. 2009-018726, as illustrated a schematic configuration in FIG. 9, it may be configured as a single-shaft type mirror 10 that changes an inclination of a reflective surface of a mirror 11 in the horizontal direction by oscillating the light reflective mirror 11 in the horizontal direction about a vertical shaft 12 by electromagnetic force.

Further, although not illustrated, the scanner may scan the emitted light in the horizontal direction and in the vertical direction, respectively, so as to perform irradiation of a predetermined area. In this case, the scanner may be configured as a dual-shaft scanning mirror that performs scanning by rotating or tilting around two shafts directed in directions orthogonal to each other.

In the embodiment, the object detecting device 9 is integrally configured with the head lamp HL, but the object detecting device may be configured as a separate component from the lamp. That is, it may be configured such that an object detecting device provided separately from the lamp may detect an object, using infrared light irradiated by an infrared light source provided in the lamp.

Further, in the embodiment, the example in which the ADB control is performed based on the detection of the object by the object detecting device, but, for example, detection of a road shape or a lane line on a road surface using infrared light may be used as an object, and automatic driving of a vehicle may be performed based on the detected object.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
   a light source; and
   a scanner configured to scan light emitted from the light source, and irradiate the scanned light toward outside a vehicle,
   wherein the light source includes a plurality of visible light sources each configured to emit visible light, and at least two infrared light sources configured to emit infrared light, the at least two infrared light sources are arranged between the visible light sources, and at least one of the plurality of visible light sources is arranged between the at least two infrared light sources.

2. The vehicle lamp according to claim 1, wherein the visible light source and the infrared light source are arranged in parallel in a scanning direction of the scanner.

3. The vehicle lamp according to claim 2, wherein light sources disposed at both ends of the plurality of light sources are visible light sources.

4. The vehicle lamp according to claim 2, wherein respective irradiation areas of the plurality of adjacent visible light sources are continuous in the scanning direction, and respective irradiation areas of the at least two adjacent infrared light sources are continuous in the scanning direction.

5. The vehicle lamp according to claim 4, wherein an area obtained by combining the irradiation areas of the plurality of visible light sources is further expanded into both sides of the scanning direction than an area obtained by combining the irradiation areas of the at least two infrared light sources.

6. The vehicle lamp according to claim 3, wherein respective irradiation area by the plurality of adjacent visible light sources are continuous in the scanning direction, and respective irradiation area of the at least two adjacent infrared light sources are continuous in the scanning direction.

7. The vehicle lamp according to claim 6, wherein an area obtained by combining the irradiation areas of the plurality of visible light sources is further expanded into both sides in the scanning direction than an area obtained by combining the irradiation areas of the at least two infrared light sources.

8. The vehicle lamp according to claim 1, wherein the visible light source and the infrared light source are formed of a semiconductor light emitting diode.

9. The vehicle lamp according to claim 2, wherein the visible light source and the infrared light source are formed of a semiconductor light emitting diode.

10. The vehicle lamp according to claim 3, wherein the visible light source and the infrared light source are formed of a semiconductor light emitting diode.

11. The vehicle lamp according to claim 1, wherein the scanner includes a rotating reflector in which an angle of a reflective surface configured to reflect light emitted from the light source is changed continuously in accordance with rotation thereof, or a movable mirror in which a reflective surface is tilted along a scanning direction.

12. The vehicle lamp according to claim 2, wherein the scanner includes a rotating reflector in which an angle of a reflective surface configured to reflect light emitted from the light source is changed continuously in accordance with rotation thereof, or a movable mirror in which a reflective surface is tilted along a scanning direction.

13. The vehicle lamp according to claim 3, wherein the scanner includes a rotating reflector in which an angle of a reflective surface configured to reflect light emitted from the light source is changed continuously in accordance with rotation thereof, or a movable mirror in which a reflective surface is tilted along a scanning direction.

14. The vehicle lamp according to claim 1, further comprising:
   a lighting controller configured to control a lighting timing of the visible light source corresponding to scanning of visible light of the scanner.

15. The vehicle lamp according to claim 2, further comprising:
   a lighting controller configured to control a lighting timing of the visible light source corresponding to scanning of visible light of the scanner.

16. The vehicle lamp according to claim 3, further comprising:
   a lighting controller configured to control a lighting timing of the visible light source corresponding to scanning of visible light of the scanner.

17. The vehicle lamp according to claim 14, wherein the lighting controller controls the lighting timing based on a detection signal of an object detector configured to detect an object based on reflected light of irradiated infrared light.

18. The vehicle lamp according to claim 17, further comprising the object detector.

* * * * *